United States Patent
Hartmann

[11] Patent Number: 5,161,376
[45] Date of Patent: Nov. 10, 1992

[54] VALVE ADJUSTMENT ARRANGEMENT AND PROCESS FOR A TANDEM PISTON MASTER CYLINDER

[75] Inventor: Willi Hartmann, Riedstadt, Fed. Rep. of Germany

[73] Assignee: Alfred Teves GmbH, Frankfurt Am Main, Fed. Rep. of Germany

[21] Appl. No.: 712,844

[22] Filed: Jun. 10, 1991

[30] Foreign Application Priority Data

Jun. 9, 1990 [DE] Fed. Rep. of Germany ....... 4018494

[51] Int. Cl.⁵ ............................ F15B 7/08; B60T 11/20
[52] U.S. Cl. ......................................... 60/562; 60/588; 60/589
[58] Field of Search .................. 60/562, 588, 589, 585

[56] References Cited

U.S. PATENT DOCUMENTS

| 3,147,596 | 9/1964 | Wallace. | |
|---|---|---|---|
| 4,510,753 | 4/1985 | Steer | 60/588 X |
| 5,044,161 | 9/1991 | Schiel et al. | 60/562 X |

FOREIGN PATENT DOCUMENTS

| 3424513 | 1/1986 | Fed. Rep. of Germany. | |
|---|---|---|---|
| 3446005 | 6/1986 | Fed. Rep. of Germany. | |
| 2632591 | 6/1989 | France. | |
| 0939335 | 10/1963 | United Kingdom | 60/562 |

Primary Examiner—Edward K. Look
Assistant Examiner—John Ryznic
Attorney, Agent, or Firm—Robert P. Seitter; J. Gordon Lewis

[57] ABSTRACT

An arrangement and process for adjusting a supply valve closing in a tandem piston master cylinder is disclosed. The tandem piston master cylinder includes a piston stroked by engagement with an operating rod and a spaced floating piston driven by an interposed return spring, the floating piston captured by the rod engaged piston during the return stroke by a headed screw abutting a projection at the end of a bore within the screw head moves during relative movement between the pistons. Supply valves are opened and closed by the position of each piston. The piston relative positions are adjusted to achieve proper supply valve closing by rotation of the rod engaged piston while fixing the floating piston against rotation which rotates the screw thread which also slightly varies the precompression of the return spring. This adjustment selectively controls the point of closing of the supply valve associated with the floating piston relative the position of the rod operated piston. Pressurized air is used to detect supply valve opening and closing during the adjustment process.

17 Claims, 2 Drawing Sheets

VALVE ADJUSTMENT ARRANGEMENT AND PROCESS FOR A TANDEM PISTON MASTER CYLINDER

The invention is related to a process for the adjustment of a tandem two piston master cylinder arrangement of the type shown in German patent application published without examination, No. 3,736,057. Arrangements of this kind are frequently utilized in master cylinders for brake systems of automotive vehicles. In this arrangement, two pistons are installed in tandem in the master cylinder, a first piston directly driven by a push rod, and a second floating piston, not rigidly connected to the first piston, but driven only by the first piston acting on the intervening volume of fluid and a stiff return spring, the floating piston having a weaker return spring urging it to a return position.

The first piston has a lost motion connection with the second piston provided by a screw threaded into one piston and axially movable received in a bore in the piston which captures the second piston during return movement to retract both pistons to an accurately controlled position. A cap or other structure fixed to the other piston engages the head of the screw as the pistons return to draw the first piston with the second piston to the accurately determined retracted position.

As the pistons return respective supply valves are opened by the movement of each piston to allow communication of the spaces ahead of each piston with the supply tank to allow hydraulic fluid to enter these spaces as needed to keep the cylinders filled with hydraulic fluid. As the pistons move forward during the next stroke, the supply valves are closed by movement of the pistons to allow pressure to be developed in the space ahead of each piston for operation of the brake system wheel cylinders.

In the past the pistons were assembled with the spacing between the two pistons in the retracted position set to meet a theoretical distance calculated to provide simultaneous closing of each supply valve as the pistons were stroked. After both pistons were assembled into the cylinder housing, the closing of the valve associated with the first or push rod piston was adjusted by inserting spacers between the point of contact on the push rod piston and the actuating rod.

However, the point of closing of the supply valve operated by travel of the second or floating piston does not correspond exactly to the travel of the first piston since there is no rigid connection therebetween, but rather depends on a great variety of varying factors subject to manufacturing tolerances. As a consequence, different valve closing times may occur, causing strongly different pressures to come about in both brake circuits at the beginning of a braking operation.

The object of the invention is to provide a process for the adjustment of a tandem piston master cylinder arrangement which affords ease and exactness of adjustment of supply valve closing points in both circuits and which is, in addition, applicable both for arrangements with central valves and with valves comprising ports in the cylinder housing opened and closed by movement of the associated piston.

SUMMARY OF THE INVENTION

The present invention comprises an arrangement for adjustably varying the travel of the second or floating piston relative the first or operating rod engaged piston after assembly into the cylinder so that the closing of the floating piston supply valve may be correspondingly adjusted to be simultaneous with closing of the first piston supply valve.

The arrangement comprises a rotational connection between the head of the capturing screw and the bore in the one piston, as by a complementary mating hexagonal shapes of each, which arrangement also establishes the required lost motion connection between the pistons. Rotation of the first piston in either direction while restraining rotation of the floating piston causes the capturing screw to be advanced or retracted to thereby vary the distance between the pistons in the return position and also the precompression of the interposed first return spring. This results in a slight varying of the travel of the floating piston relative the rod engaged piston during the initial part of a stroke, to in turn vary the exact point of closing of the second supply valve.

In the process according to the present invention, the pistons are assembled together and installed in the cylinder. The operating rod engaged piston is withdrawn to its fully retracted or return position, and then advanced to a point where the first supply valve just closes, which point is preferably detected by pressurizing the inlet to the supply valve with air pressure and monitoring the pressure effects caused by the valve closing.

The first piston is then rotated as by engagement of a slot formed in the piston end with a screw driver, while being able to move axially, until the second supply valve changes condition, i.e., if open, until it closes, if closed, until it opens. In the latter case, rotation may be slightly reversed to just close the second supply valve.

These conditions are preferably detected by pressurizing the supply port with air or other pressure and maintaining pressure conditions to detect valve opening or closing.

The rotational position of the screw thread is fixed in the finally adjusted position to set properly the respective supply valve openings.

DETAILED DESCRIPTION

Figure 1:
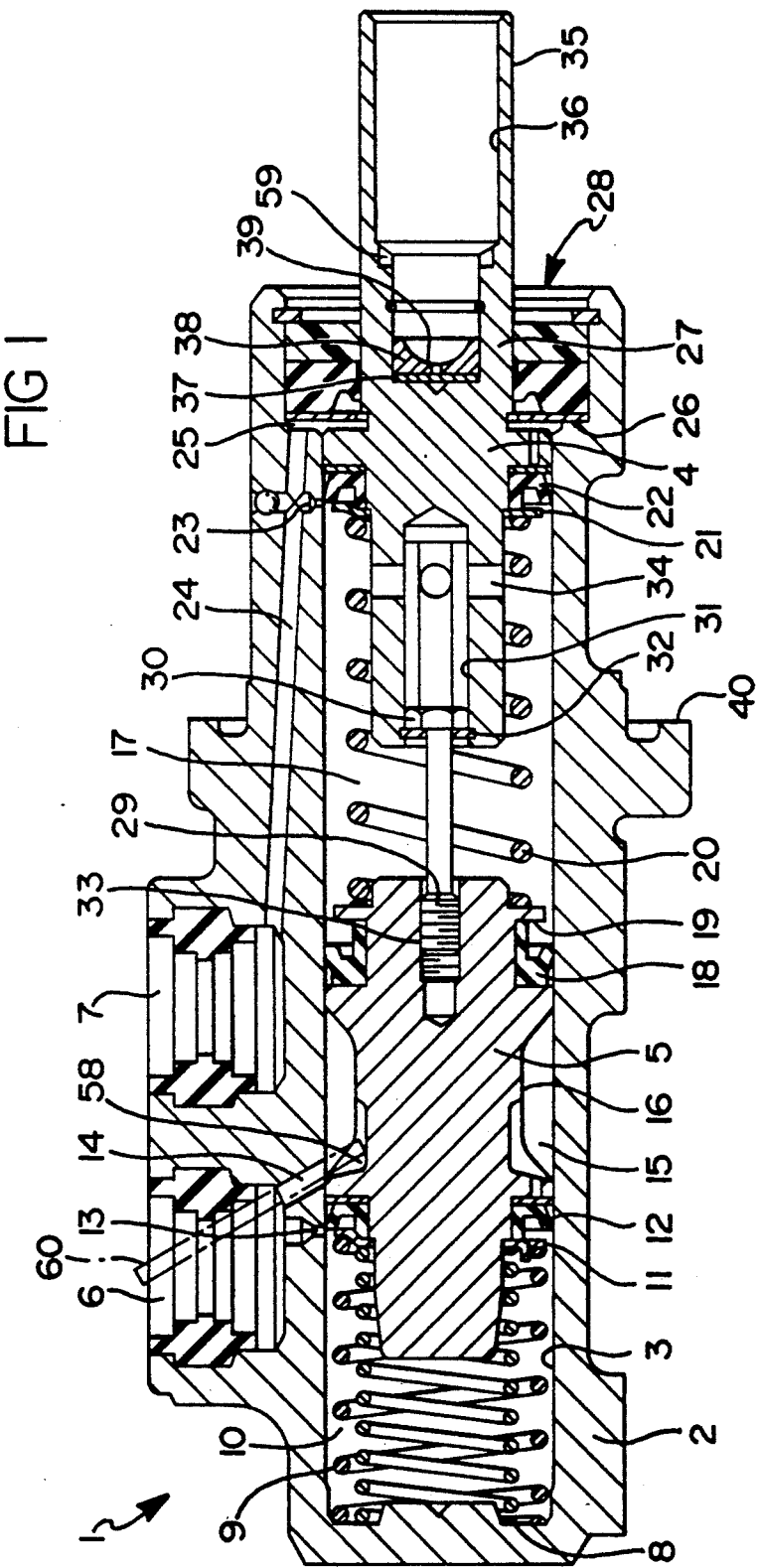
FIG. 1 shows a cross section in the axial direction of a tandem piston master cylinder according to a first embodiment of the present invention with two supply ports opened and closed by movement of an associated piston.

In FIG. 1, a tandem piston master cylinder 1 can be seen which is comprised of a cylinder housing 2 with a cylinder bore 3 within which a first, push rod-engaged piston 4, and a second, floating piston 5, are sealedly and axially slidably guided. The two pistons 4 and 5 are adapted to be stroked by engagement of the first piston by an operating rod, forcing the pistons 4 and 5 to the left to pressurize the pressure chambers 10, 17 to in turn pressurize the brake system via flow paths not here shown. The inlet connections 6, 7 are provided to a supply tank (also not shown).

A second piston return spring 9 prestresses the floating piston 5 in the direction towards the open end of the cylinder bore 3, engaging the endwall 8 of the cylinder bore 3. The second piston return spring 9 is positioned within the second pressure chamber 10. The floating piston 5 has a radial collar 11 mounted thereto, against which the return spring 9 is engaged and by which a cup-type seal 12 is fixed to the piston 5.

A first piston return spring 20, stiffer than the second piston return spring 9, is interposed between the pistons 4, 5, and engages the end of the floating piston 5 which faces said first pressure chamber 17, with the other end bearing against a radial collar 21 of the push rod piston 4. The radial collar 21 secures a cup-type seal 22 to the piston 4, which interacts in the same manner as described before with a valving port 23 connected through a duct 24 to the connection 7. The duct 24 leads into an annular chamber 25 which is formed by a step 26 of said cylinder bore 3, by a tapered portion 27 of the push rod piston 4, and by a sealing and securing package 28. Annular chamber 25 functions as an intake chamber. The sealing and securing package 28 closes off the cylinder bore 3.

The two pistons 4, 5 are not rigidly connected together, but have a lost motion connection with respect to each other in which the first piston 4 captures the floating piston 5 during the last stages of return movement. This connection is created by means of a capturing screw 29 which also sets the degree of initial or precompression of return spring 20 to prestress the first piston return spring 20. A hexagon shaped enlarged head 30 is formed on one end of the capturing screw 29 and secured by a retaining snap ring 32 in an axial recess 31 of the first piston 4 which recess 31 is also shaped, hexagonally the same as head 36, and is slidable within it in the axial direction. The snap ring 32 serves as an axial stop limiting the extent of axial movement. The capturing screw 29 is screwed into a counter thread 33 in the floating piston 5.

As a result of the foregoing, the capturing screw 29 rotates with the push rod piston 4 and thus may be screwed into the counter thread 33 by rotating the piston 4. Shapes other than hexagonal which are not symmetrical with respect to rotation, such as, for example, a square or an oval shape can be employed for the head 30 and axial recess 31.

The axial recess 31 is connected to the first pressure chamber 17 by a radial bore 34, so that upon sliding of the head 30 into the recess 31, the displaced brake fluid may escape into the first pressure chamber 17.

In the same manner, it is possible to reverse the arrangement and provide the axial recess in the floating piston 5 and to position the counter thread in the push rod piston 4. In this arrangement the axial distance between the two pistons 4, 5 when the valves are opened will also be able to be modified by rotation of the push rod piston 4 and with the floating piston 5 secured against rotation.

The tapered end 35 of the piston 4 which projects through the sealing and securing package 28 out of the cylinder housing 2 is furnished with a second axial recess 36 into which spacer discs 37 and a thrust piece 38 are inserted, so that the point of engagement 39 of an actuating rod (not shown) mating part, for example, of a brake power booster or of a pedal rod system, is located in a defined position with respect to the cylinder housing 2. The abutment surface 40 provides an accurately located mounting surface on the cylinder housing 2 with which the tandem master cylinder is abutted against a brake power booster or at the splash plate.

Figure 2:
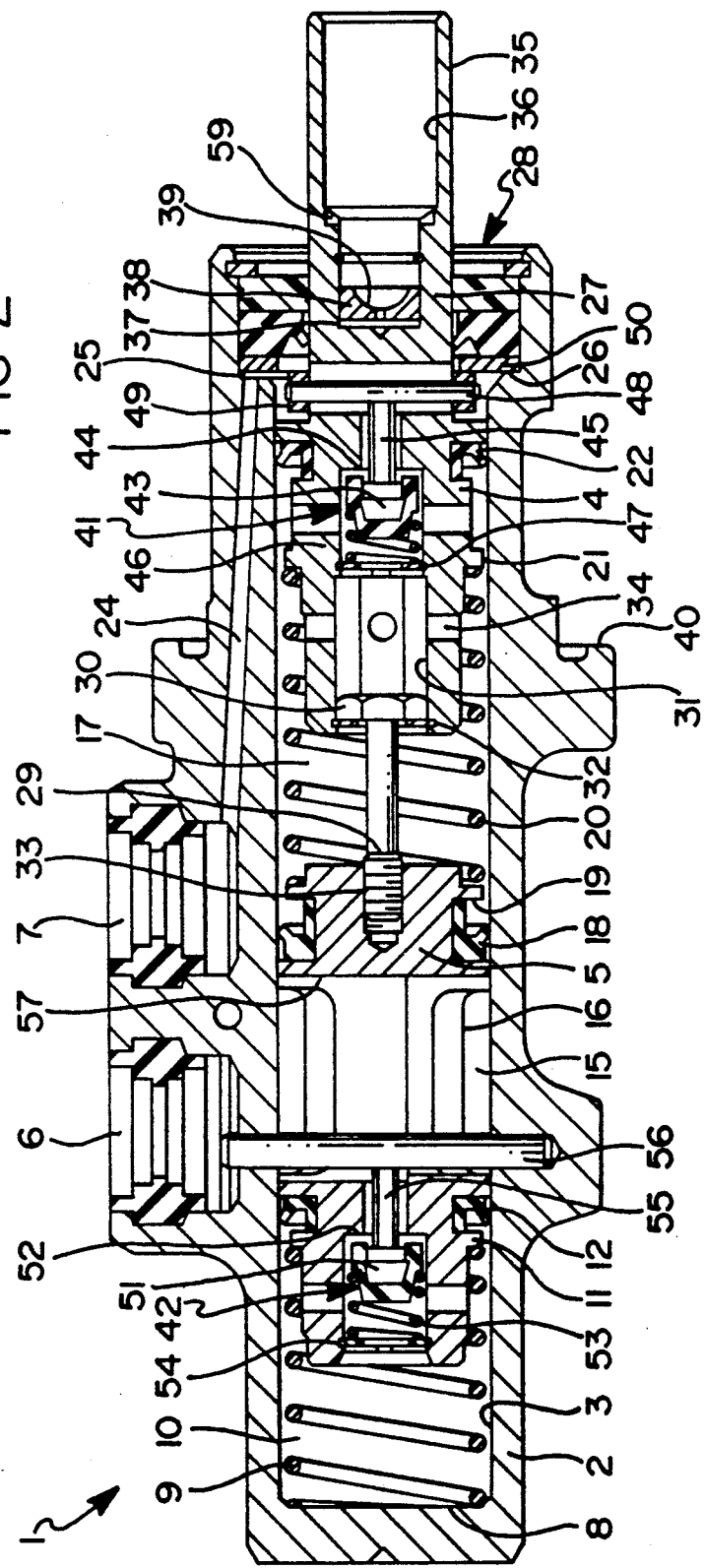
FIG. 2 shows a cross section in the axial direction of a tandem piston master cylinder according to a second embodiment of the present invention with two central supply valves.

The tandem piston master cylinder 1 shown in FIG. 2 is distinguished only by the valve mechanism from the one described above. Accordingly, all identical components are given identical reference numerals as in FIG. 1, only the two central supply valves 41, 42 explained in detail.

The first central supply valve 41 is positioned within the piston 4 and is comprised of a valve body 43, having a valve seat 44 which is integrated in said first piston 4. An extension rod 45 is provided to open the valve 47 by moving the same from the valve seal 44 against the bias, of a central valve spring 46, which is compressed against a snap ring installed in piston 4 to prestress the valve body 43 in the closing direction. A pin 48 serves as a stop, to engage extension rod 45, the pin 48 secured in a ring 49 which is in abutment against a disc 50 rigidly coupled to the cylinder housing 2. The extension rod 45 abuts the pin 48 when the piston 4 moves to the return position and lifts the valve body 43 off the valve seat 44, so that communication between the first pressure chamber 17 and the annular chamber 25 is opened and as a result the pressure chamber 17 is depressurized.

In the event of actuation, the ring 49 will be lifted off from the disc 50 on the central valve spring 46 will slide the valve body 43 against the valve seat 44. Pressure then can be built up within the pressure chamber 17.

The second central supply valve 42, which is positioned within the floating piston 5, operates in the same way. It is comprised of a valve body 51, a valve seat 52, and a central valve spring 53 which is compressed against a snap ring 54. An extension rod 55 is adapted to engage a pin 56 which is fixed to the housing 2 and which extends through an axially extended slot 57 in the second piston 5. The pin 56 is arranged parallel to the intake bore (14 in FIG. 1) which is not visible in FIG. 2.

The assembly of both of the two piston-and-cylinder arrangements shown in FIGS. 1 and 2 is carried out almost in the same way. For this reason, it will be described for both of them in common, and the differences will be indicated in detail. First of all, each of the cup-type seals 12, 18, 22 will be fit onto the pistons and, secured to the radial collars 11 and 21 (projections in FIG. 2). Subsequently, the central supply valves 41, 42 are completely mounted within the two pistons 4, 5. Next the end 30 of the capturing screw 29 is secured within the axial recess 31, then the first piston return spring 20 is slid on the capturing screw 29 screwed into the counter thread 33 in the second piston 5. After the second piston return spring 9 has been inserted into the cylinder bore 3, the pistons 4, 5, which are coupled to each other will be assembled in the bore 3 and secured by closing the cylinder bore 3 by the installation of the sealing and securing package 28. The pin 56 is then installed in the version of FIG. 2.

As the next step, the pistons 4, 5 are advanced into the bore 3 a sufficient distance in the direction of actuation so that the first supply valve 42 closes. This will particularly easily be detectable by monitoring any pressure change while the pressure chambers are pressurized with compressed air.

Utilizing the supply valve design of FIG. 1, the compressed air will moreover provide a check of the second pressure chamber 10 that the cup-type seal 12 is effectively sealing against the cylinder bore 3.

The push rod piston 4 is then held fast in its axial position and the floating piston 5 secured against turning. As an especially simple design solution, the pin 56 can serve as an anti-rotating means as far as the design version according to FIG. 2 is concerned. The axial slot 57 allows axial movement of the piston 5 while preventing rotation. When assembling a tandem piston master cylinder 1 with valving ports 13, 23 and cup-type seals 12, 22 as shown in FIG. 1, a locking pin 60, shown in phantom, may be inserted through the intake bore 14 which engages a groove 58 being milled into the floating piston 5 and in this way safeguarding the piston 5 against rotation while allowing axial movement.

It is now checked whether the second supply valve (12, 13, or 42) is open or closed. If the second piston 5 is held fast as a safeguard against rotation, then the first piston 4 will be rotated so that the capturing screw 29 becomes screwed and out in the counter thread 33, causing the position of the floating piston 5 to be thereby moved axially and the first piston return spring 20 to be slightly compressed or relaxed. In order to be able to slightly rotate the push rod piston 4, a notch 59 is provided in the range of the second axial recess 36 which can be engaged by a tool such as a screw driver.

The push rod piston 4 will be rotated until the floating piston 5 advanced or retracted a sufficient distance so that the second supply valve changes its closing condition, that is to say, until it opens if it had been closed before and vice versa. This, too, will be detectable from a pressure change in the pressure chamber 10, provided that it had been pressurized with compressed air.

If the second supply valve is opened, slight reverse rotation of piston 4 to just close the second valve may be carried out to insure perfectly timed valve closings.

Next, the thread of the capturing screw 29 and of the second piston 5 are fixed. This can be accomplished without further effort if before assembly, the counter thread 33 has been coated with a locking compound, such as Tuf-Lok (trademark) or if the thread shape had been only partially formed.

After having secured the thread against any further undesired rotation, the locking pin 60, if used, will be removed from the intake bore 14 and both pistons 4, 5 will be retracted for a predetermined valve closing distance. Subsequently, the position of the push rod piston 4 will still be established with respect to the cylinder housing 2 by determining, for example, the distance between the abutment surface 40 and the bottom of the second axial recess 36.

Lastly, the distance between the abutment surface 40 (comprising a reference point at the cylinder housing 2) and the point of engagement 39 of an actuating rod will be adjusted by inserting spacer discs 37 and a thrust piece 38.

I claim:

1. A tandem piston master cylinder for a brake system comprising:

cylinder housing formed with a bore, and having an endwall at the end of said bore;

a first, rod engagable piston slidably received in said bore and having a protruding portion for engagement with an operating rod to be driven in an actuating stroke toward said end wall;

a second, floating piston slidably received in said bore and spaced from said first piston and adjacent said endwall;

a first pressure chamber in said housing defined between said first and second pistons and a second pressure chamber in said housing defined between said second piston and said endwall;

a first piston return spring compressed between said first and second pistons and a second piston return spring compressed between said endwall and said second piston, said return springs urging said first and second pistons to a return position;

lost motion connection means acting between said first and second pistons allowing relative axial motion between said pistons, said first piston capturing said second piston during the final return motion to locate said pistons a predetermined distance apart in said return position;

connection means for connecting an unpressurized supply of fluid to each of said first and second pressure chambers;

first supply valve means associated with said first piston controlling communication between said connection means and said first pressure chamber, said first supply valve means closing communication upon movement of said first piston from said return position to a predetermined position in said cylinder housing;

second supply valve means controlling communication between said connection means and said second pressure chamber, said second supply valve means closing communication upon movement of said second piston from said return position to a predetermined position in said cylinder housing;

adjustment means enabling varying the predetermined distance said first and second pistons are spaced apart in said return position with said pistons assembled in said cylinder housing, thereby also relaxing or compressing said first return spring to vary the position of said second piston relative said first piston when said second supply valve means closes communication between said connection means and said second pressure chamber, said adjustment means including connection means between said first and second pistons causing relative axial advance or retraction of said second piston upon rotation of said first piston in either direction, and locking means for holding said second piston from rotating in said cylinder housing bore installed therein.

2. The tandem piston master cylinder according to claim 1 wherein said adjustment means and said lost motion connection means comprises a threaded element threaded into one of said pistons and extending into an axial bore in the other of said pistons to allow relative axial movement therebetween, said threaded element including a portion moving into engagement with the other of said pistons during movement of said pistons to said return position, and wherein said adjustment means and lost motion connection means further comprises a rotary connection between said other piston and said threaded element allowing said relative axial movement therebetween and locking means for preventing rotation of said second piston in said bore, whereby rotation of said first piston causes a change in the predetermined distance apart of said pistons in said return position by advance or retraction of said threaded element in said one piston.

3. The tandem piston master cylinder according to claim 2 wherein said rotary connection means comprises an interfitted shape of said portion of said threaded element and said axial bore preventing rotation while allowing relative axial movement.

4. The tandem piston master cylinder according to claim 3 wherein said threaded element comprises a screw having a head comprising said portion, said screw being hexagonally shaped, said axial bore also being hexagonally shaped and having said head slidably fit thereinto.

5. The tandem piston master cylinder according to claim 2 wherein said locking means for preventing rotation of said second piston comprises a locking pin extending through an opening included in said connection means for supplying fluid to said first and second pressure chambers.

6. A process for the adjustment of a tandem piston master cylinder of the type having a pair of pistons slidable in a bore in a cylinder housing, one of the pistons engaged with an operating rod to be storked in said bore, the other of said pistons spaced from said one piston, each of said pistons urged to a return position by respective return springs, with the one of said return springs acting on said one piston interposed between said pistons, a lost motion connection acting between said pistons allowing relative axial motion therebetween during stroking but causing said one piston to capture said other piston as said pistons move to said return position so as to establish a predetermined axial space between said pistons in said return position, and separate supply valve means operated by each piston, opening communication of a pressure chamber space ahead of each piston with fluid supply passage means as each of said pistons moves to said return position and closing communication therebetween as each piston is stroked, said process including the steps for adjusting the point of closing of said supply valve means operated by said other piston, comprising the steps of connecting said pistons together so that rotation of said one piston causes relative axial advance of the other piston, when the other piston is held against rotation, adjusting the predetermined spacing between said pistons by rotating said one piston and holding said other piston, while holding said one piston at an axial position where said supply valve means operated thereby has just closed communication, until said supply valve means operated by said other piston just changes condition, and then adjusting said predetermined spacing so that said supply valve means operated by said other piston just closes.

7. The process according to claim 6 further including the step of pressurizing each of said supply valve means with air pressure and monitoring pressure changes thereof to detect closing and opening of said supply valve means during said adjustment step.

8. The process according to claim 6 wherein said adjustment step includes the step of connecting said pistons with an element threaded to one piston and having a rotationally fixed but axially movable relationship with another piston, said process also including the step of rotating said one piston while holding said one piston in said axial position whereat said supply valve means operated thereby is just closed, while rotationally holding the other piston so as to axially advance or retract the other piston to vary said predetermined spacing.

9. The process according to claim 8 wherein said connecting step also establishes said lost motion connection.

10. A process for the adjustment of a tandem piston power cylinder arrangement, including a cylinder housing having a bore, a first, push rod piston in said bore adapted to be stroked by engagement with an operating rod to pressurize a pressure chamber ahead of said first piston, by stroking of said first piston, and a second, floating piston in said bore located spaced ahead of said first piston in the actuating stroke direction adapted to be stroked to pressurize a pressure chamber ahead of said second piston, and with a respective supply valve associated with each of the first and second pistons, each of said supply valves closing communication between one of said first and second pressure chambers, respectively, and a pressureless supply tank by the position of a respective one of said pistons, said two pistons having a lost motion connection therebetween established by means of a capturing screw threaded into one piston and having a head received in a bore in the other piston, with a projection engaging said screw head upon movement of said push rod piston to a return position; a return spring urging each of said pistons to said return position, said return spring urging said first piston to said return position interposed between said pistons, said first piston return spring being stronger than said second piston return spring to enable an actuating force to be transmitted from said first to said second piston;
said process comprising the steps of:
retracting said pistons to said return position;
advancing said two pistons axially from said return position to a position where the supply valve associated with the first piston closes;
holding the first piston in that axial position;
establishing a rotary connection between said capturing screw and one of said pistons;
modifying the axial distance between said two pistons by rotating said first piston whereby the active length of the said capturing screw is modified, until the supply valve associated with said second piston changes the closing condition existing at the start of said adjustment process; and,
thereafter, securing said capturing screw against turning in said one piston.

11. The process as claimed in claim 10, further including the steps of applying a fluid pressure to said two pressure chambers during said adjustment process; and, monitoring the pressure applied to said pressure chambers to detect opening or closing of said supply valves by detecting relevant pressure changes.

12. The process as claimed in claim 10, further including the step of pressurizing said two pressure chambers by pressure fluid during said adjustment process; monitoring the pressure chambers to detect opening or closing of said supply valves by relevant pressure changes.

13. The process as claimed in claim 10 wherein said cylinder housing has two connections for said supply tank which are connected by means of intake bores to one of each pressure chambers, further comprising the step of inserting a locking pin through the intake bore associated with the second said pressure chamber into a groove formed in said floating piston to lock said floating piston against rotation.

14. A process as claimed in claim 13, said central valve located within said floating piston and opened by moving against a stop, said stop comprising said locking pin.

15. A process as claimed in claim 10 wherein the step of establishing the rotary connection between said capturing screw and said one of said pistons comprises the step of shaping said head of said capturing screw to be hexagon-shaped and form said bore complementarily to so that said head cannot rotate therein and interact with an axial recess in one of the said pistons.

16. A process as claimed in claim 10 further including the step of forming said first piston with a notch and rotating said first piston with a tool configured to engage said notch.

17. A process as claimed in claim 10 characterized in that at least one of said supply valves is configurated as a central valve.

* * * * *